No. 737,490. PATENTED AUG. 25, 1903.
E. ROGERS & C. W. SAGEE.
GLASS PRESS.
APPLICATION FILED APR. 6, 1903.
NO MODEL. 4 SHEETS—SHEET 3.
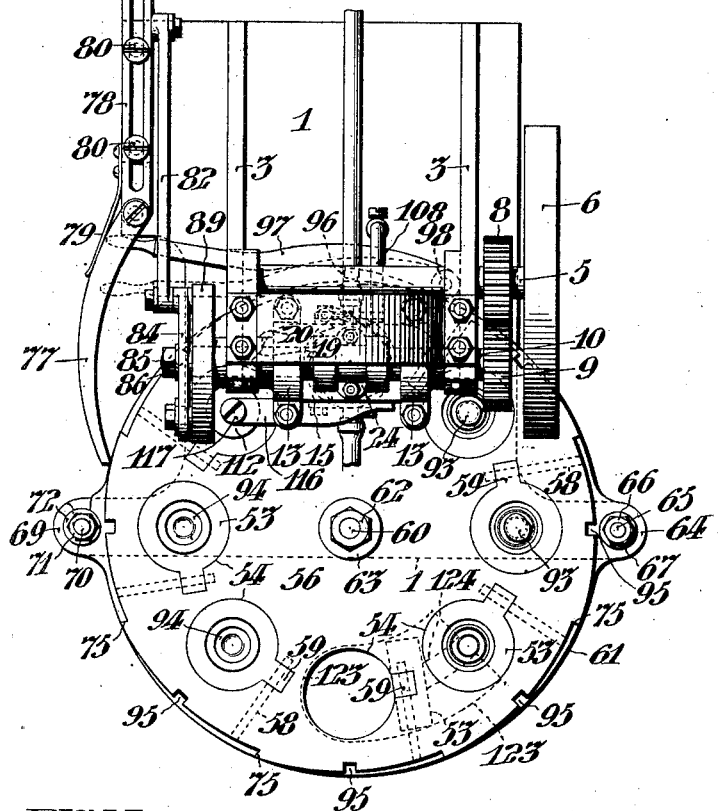
FIG. III.
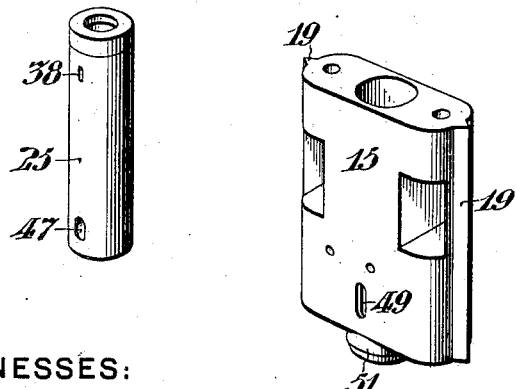
FIG. VI. FIG. V.
FIG. VII.
FIG. VIII.
FIG. IX.
WITNESSES:
Clifton C. Hallowell
John C. Bergner
INVENTORS
CHARLES W. SAGEE
AND
EPHRAIM ROGERS,
by Arthur E. Paige
Atty.

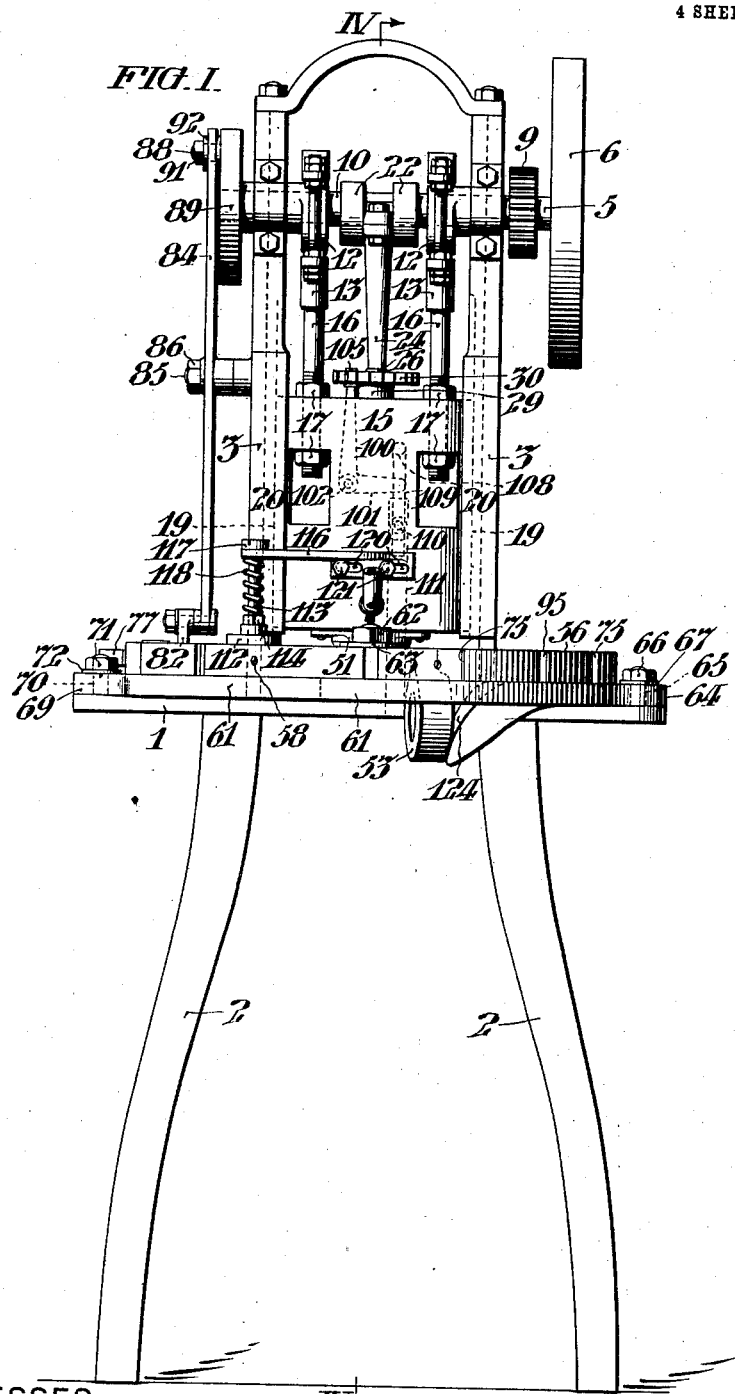

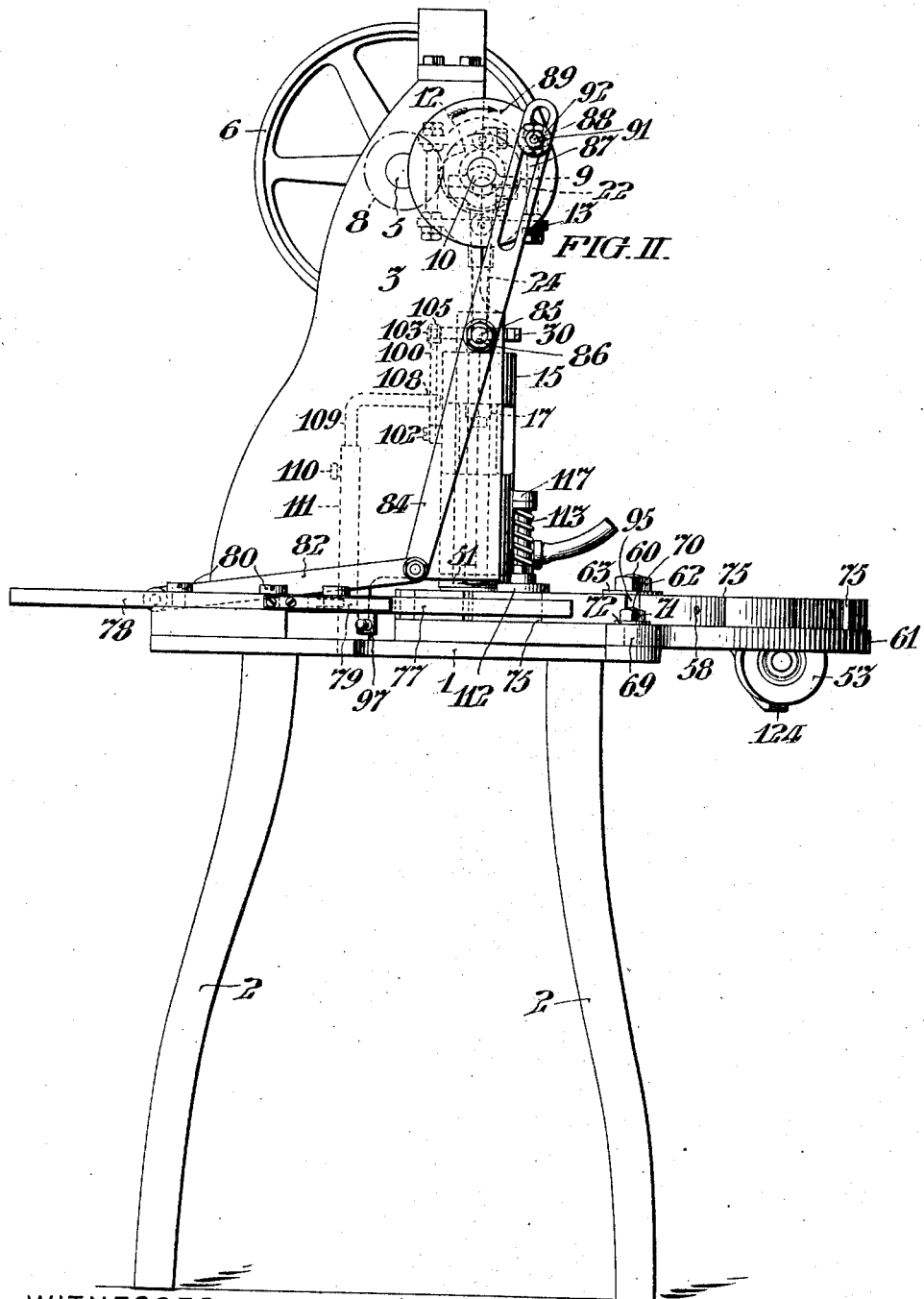

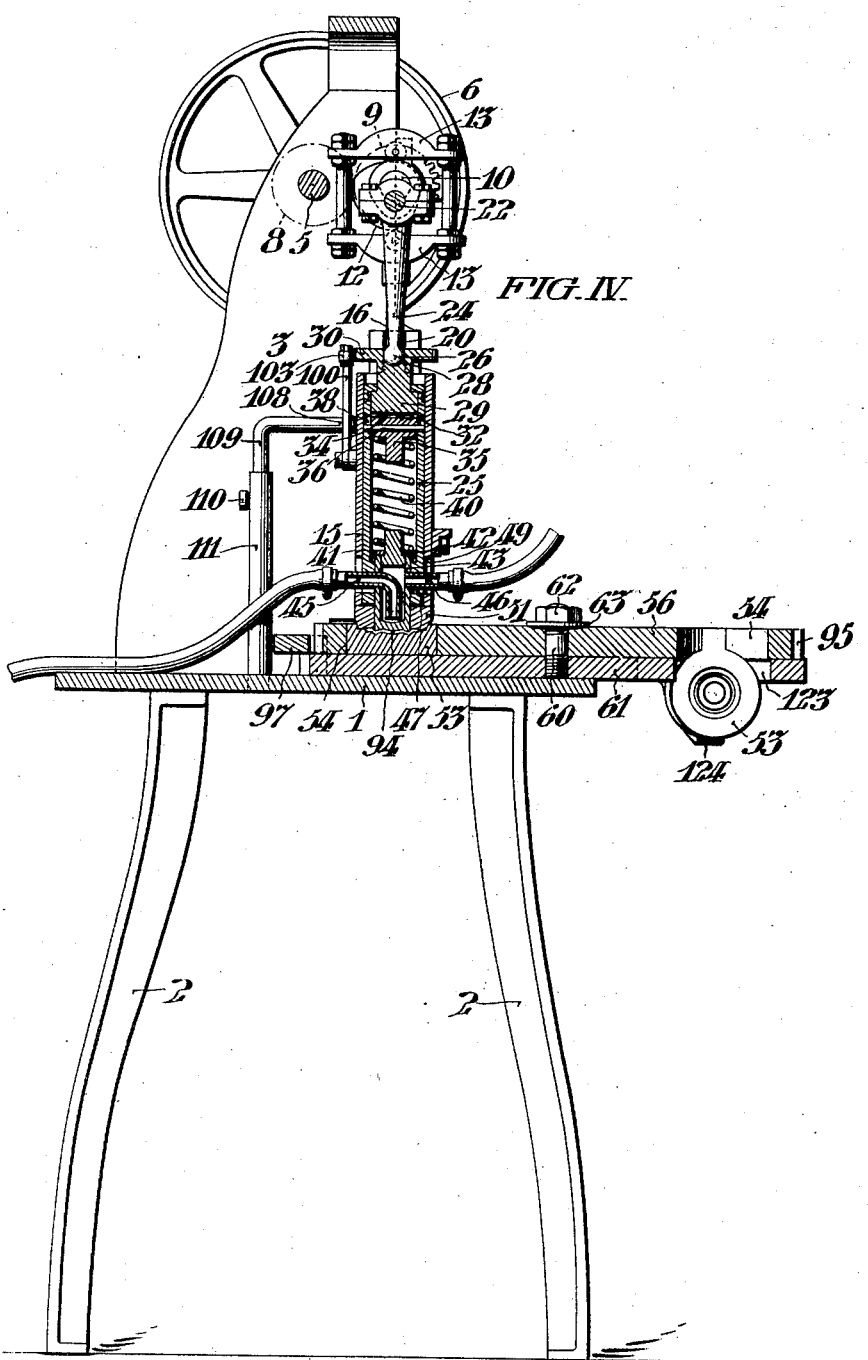

No. 737,490. Patented August 25, 1903.

UNITED STATES PATENT OFFICE.

EPHRAIM ROGERS AND CHARLES W. SAGEE, OF PHILADELPHIA, PENNSYLVANIA, ASSIGNORS TO SALMON B. ROWLEY.

GLASS-PRESS.

SPECIFICATION forming part of Letters Patent No. 737,490, dated August 25, 1903.

Application filed April 6, 1903. Serial No. 151,218. (No model.)

*To all whom it may concern:*

Be it known that we, EPHRAIM ROGERS and CHARLES W. SAGEE, of Philadelphia, Pennsylvania, have invented certain new and useful Improvements in Glass-Presses, whereof the following is a specification, reference being had to the accompanying drawings.

Our improvements relate to machines for pressing glass articles in molds which are brought successively in registry with a complementary die or dies carried on a reciprocatory plunger.

In the form of our invention chosen for illustration the molds are hung on eccentric pivots in a rotatable carrier which is axially mounted on a supporting-plate eccentrically pivoted to a stationary bed-plate in such relation that the mold-carrier can be swung to and from operative relation with the plunger, so as to afford access to the dies on the latter without removing it from its housings. However, said supporting-plate remains stationary during the continued operation of the press, and said mold-carrier is provided with mechanism to intermittently shift it to successively present the molds in registry with said plunger and subsequently in registry with an opening in said supporting-plate, through which each mold is in turn swung downwardly by gravity to discharge its completed glass article. Said embodiment of our invention comprises a compound plunger whose inner and outer telescopically-related members are adapted to be independently reciprocated, the outer member having a stroke which is definite and invariable (except for purposes of adjustment) and the inner member having a stroke which is not only variable under yielding pressure, but is automatically made progressively less yielding from one stroke to another for a predetermined number of pressing strokes and is then automatically restored to its individual capacity to yield, the object of such an arrangement being to mold successive clippings from a single gather under pressure, which increases as the clippings are less and less hot and plastic. Moreover, said embodiment of our invention comprises a platen carried by the reciprocatory plunger to encounter the pressed articles in the molds immediately after the latter are removed from registry with the plunger-die in such manner as to depress any upwardly-overpressed glass projecting from the molded articles and restore the latter to proper form while plastic.

Our invention comprehends the various novel features of construction and arrangement herein set forth.

In the drawings, Figure I is a front elevation of a press conveniently embodying our improvements. Fig. II is a side elevation of said press. Fig. III is a plan view of said press. Fig. IV is a central vertical sectional view of said press, taken on the line IV IV in Fig. I. Fig. V is a perspective view of the outer cross-head member of the die-carrying plunger. Fig. VI is a perspective view of the inner spring-casing member of the die-carrying plunger. Fig. VII is a perspective view of the rotary crown-cam. Fig. VIII is a perspective view of the reciprocatory cam. Fig. IX is a perspective view of the central die-head which is carried by the spring-casing shown in Fig. VI.

In said figures, 1 is the stationary bed-plate, provided with the legs 2 and standards 3, the main driving-shaft 5 being mounted to rotate in the latter and provided with the band-wheel 6. Said shaft 5 is also provided with the gear-wheel 8, engaged with the gear-wheel 9 on the crank-shaft 10, having two eccentrics 12, whose yokes 13 are adjustably connected with the outer cross-head plunger 15 by means of the screw-threaded rods 16 and nuts 17, and said cross-head 15 is provided with laterally-projecting guides 19, fitted in slideways 20 in said standards 3, so as to be positively reciprocated by the rotation of said crank-shaft 10. Intermediate of said eccentrics 12 said shaft 10 is provided with the crank 22, connected by the pitman 24 with the inner spring-casing plunger 25, the ball end 26 of said pitman 24 being seated in the socket 28 in the rotatable crown-cam 29, provided with the ratchet-wheel 30. Said cam 29 is provided at its lower end with the helical cam-surface 32, opposed to the complementary surface 34 of the reciprocatory crown-cam 35, which latter is prevented from rotating in the casing 25 by its cross-pin 36 projecting within the slots 38 in said casing. Said cam 35 constitutes an automatically-adjustable abutment for the upper end of the spiral spring 40, whose lower end rests upon the washer 41, mounted upon the shoulder 42 of the hollow die-head 43, which latter is provided with an inlet 45 and outlet 46 for a cooling medium. Said inlets and outlets project through slots 47 in the casing-plunger 25 in registry with slots 49 in the cross-head plunger 15 and serve to limit the relative motion of said plunger members 15 and 25 and the die-head 43. The central die-head 43 aforesaid is surrounded by the annular die 51, carried in concentric relation therewith by the outer plunger member 15, and all of said plunger members are arranged to be reciprocated by the mechanism above described to successively coöperate with the molds 53, which are seated in apertures 54 in the mold-carrier 56, in which they are eccentrically pivoted upon respective pins 58, which extend through their lugs 59, as best shown in Fig. III. Said mold-carrier 56 is axially mounted to rotate upon the stud 60, which projects from the supporting-plate 61, upon which said carrier is retained by the nut 62 and washer 63. In order to afford access to the lower face of the dies 43 and 51 and to facilitate the adjustment and removal of the latter, said supporting-plate 61 is provided with the lug 64, by which it is pivotally mounted upon the eccentric-stud 65, projecting from the stationary bed-plate 1, upon which stud said plate 61 is retained by the nut 66 and washer 67, as shown in Fig. III. The opposite side of said plate 61 is provided with the lug 69, which encounters the abutment-stud 70, projecting from the stationary bed-plate 1, and said supporting-plate 61 is conveniently clamped in normal stationary relation with the stationary bed-plate 1 by the nut 71 and washer 72, engaged with said stud 70. The periphery of said rotary mold-carrier 56 is provided with a series of ratchet-teeth 75, corresponding in number with the molds 53, and said carrier is adapted to be intermittently rotated upon the stud 60 by engagement of the pawl 77 with said teeth 75, said pawl being mounted upon the slide 78 and provided with the spring 79 to press it into engagement with the periphery of the mold-carrier. Said slide 78, being mounted to reciprocate upon the studs 80, projecting from the stationary bed-plate 1, is reciprocated in definite relation to the reciprocation of the compound die-plunger above described by the link 82, which connects said slide with the lower extremity of the lever 84, which is mounted to oscillate upon the stud 85, projecting from the standard 3, upon which it is retained by the nut 86. The upper extremity of said lever 84 comprises the slot 87, in engagement with the wrist-pin 88, projecting from the wrist-plate 89, to which it is secured by the nut 91 and washer 92, and said wrist-plate 89 is rotated by the crank-shaft 10, upon the extremity of which it is mounted. The crank-shaft 10 is rotated in the direction indicated by the arrow shown in Fig. II, so that the mold-carrier 56 is presented with one of its molds 53 in registry with the die members 43 and 51, while the compound plunger is raised, and the outer cross-head member 15 of the plunger is then lowered in registry with the mold 53, as indicated in Fig. IV, and the inner plunger member 25 is then lowered with the central die member 43, so as to compress a clipping of glass 93 in said mold 53 to form the pressed article 94. (Shown in section in Fig. IV.) Said mold-carrier 56 may be provided with any convenient means for locking it with a mold 53 in registry with the die-plunger during the pressing operation aforesaid. For instance, the series of notches 95 may be provided in the periphery of said carrier, adapted to be engaged by the lug 96 of the locking-lever 97, which latter is pivoted on the stud 98, projecting from the bed-plate 1. The capacity of the central die-head 43 to yield while molding the glass is gradually lessened in correspondence with the lessening in plasticity of the successive clippings of glass (due to the cooling of the gather) by automatic rotation of the crown-cam 29 between successive downward strokes of the compound plunger, and such rotation is conveniently effected by means of the bell-crank lever comprising the arms 100 and 101, pivoted on the stud 102, projecting from the plunger cross-head 15, the pawl 103 being pivotally retained upon the upper extremity of the arm 100 by the nut 105 and being pressed by the spring 106 into operative engagement with the teeth of the ratchet-wheel 30. The lever-arm 101 is so arranged as to encounter the stationary projecting end 108 of the bar 109, which latter is adjustably secured by the set-screw 110 in the tubular standard 111 on the bed-plate 1.

It is to be understood that the above-described arrangement is such that between successive downward strokes of the compound plunger carrying the dies the crown-cam 29 is rotated to the extent of one of the twenty teeth of the ratchet 30, and the crown-cam 35 is thus lowered one-twentieth of the axial extent of the helical cam-surfaces 32 and 34 and correspondingly increases the pressure of the spring 40. We find it convenient to prevent accidental backward rotation of the cam 29 by serrating the opposed helical surfaces, as indicated by the radial lines in Fig. VIII.

Inasmuch as the bulk of any clipping may be so great as to produce an overpress of glass corresponding with the crevice between the die members 43 and 51, the overpress-platen 112 is arranged to register with each mold, (in the position to which the latter is first shifted after the pressing operation,) so as to depress any such overpress, and thus free the top of the finished article 94 from projections, which would render it unfit for use. Said platen 112 is screwed on the lower end of the stem 113, upon which it may be adjustably set by the nut 114 in proper relation with the mold 9, with which it is to coöperate. Said stem being mounted to slide vertically in the bracket 116, in which it is retained by its head 117, the platen 112 is yieldingly presented in definite relation with the mold by the spring 118 surrounding said stem. Said bracket 116 comprises the slots 120, through which it is adjustably secured by the bolts 121 upon the face of the plunger crosshead 15, whereby said platen 112 is raised and lowered in definite relation to the other operations of the press.

It is to be understood that the plate 61 supports each of the molds 53 during their progression beneath the compound die-plunger and the overpress-platen and until the intermittent rotary progression of the carrier 56 successively brings each mold into registry with the opening 123 in the supporting-plate 61, whereupon the mold which is registered with said opening is swung downwardly upon its eccentric pivot-pin 58 by gravity to the position indicated at the lower part of Fig. III, so as to discharge its completed article 94. The dropped mold 53 encounters the cam-incline 124, adjoining said aperture 123, and is restored to its normal position in the carrier 56 by riding up said cam-incline during the next shifting movement of the said carrier 56.

The press above described is conveniently operated as follows: Successive clippings 93 from a gather of glass are deposited in the molds 53, as indicated in Fig. III, and said molds being successively presented in registry with the plunger members 15 and 25 the former is first lowered, bringing the annular die 51 into engagement with the mold 53, as indicated in Fig. IV. The central die 43 is then lowered under the predetermined yielding pressure transmitted from the crank 22, through the pitman 24, crown-cams 29 35, spring 40, and washer 41, to said die 43.

It is to be understood that each ordinary gather of glass will supply, approximately, sixteen clippings 93, each sufficient to make a pressed article 94, but characterized by different degrees of heat and plasticity. Said clippings are presented in succession beneath the compound die-plunger, beginning when the two crown-cams 29 and 35 are in their position of adjustment in which the spring 40 is most yielding, and said spring is compressed step by step during the sixteen successive strokes of the plunger devoted to the sixteen clippings and also during four additional strokes, which latter are, however, idle and simply afford an opportunity for the operator to secure another gather of glass and present the first clipping from the same beneath the plunger when the crown-cams have assumed their initial position. Each of the articles pressed in the manner described is in turn opposed by the overpress-platen 112 to insure the removal of any upward projections on its face and is thereafter discharged by the gravitation of the mold 53, in which it is formed, as above described.

It is to be understood that the number of teeth in the ratchet 30 may be varied in accordance with the size of the articles to be molded, or the means for progressively varying the elastic medium in the connections between the crank 22 and the die 43 may be rendered inoperative by adjustment of the bar 109. Moreover, we do not desire to limit ourselves to the precise construction and arrangement set forth, as it is obvious that various modifications may be made therein without departing from the essential features of our invention.

We claim—

1. In a glass-press, the combination with a reciprocatory plunger-die and a fixed bed-plate; of a supporting-plate eccentrically pivoted to said bed-plate; and, a rotatable mold-carrier axially pivoted on said supporting-plate; whereby said mold-carrier can be swung to and from operative relation with the plunger-die, substantially as set forth.

2. In a glass-press, the combination with a reciprocating plunger-die and a fixed bed-plate; of an abutment on said plate; a supporting-plate pivoted near one of its edges to said bed-plate and provided near its opposite edge with means to engage said abutment; and, a rotatable mold-carrier axially pivoted on said supporting-plate; whereby said mold-carrier can be swung to and from operative relation with the plunger-die, substantially as set forth.

3. In a glass-press, the combination with a reciprocating plunger-die and a fixed bed-plate; of a supporting-plate eccentrically pivoted to said bed-plate; a rotatable mold-carrier axially pivoted on said supporting-plate; and, a driving-shaft and connections therefrom arranged to reciprocate said plunger-die and intermittently rotate said mold-carrier, substantially as set forth.

4. In a glass-press, the combination with a mold; of a plunger-die and means to reciprocate said die in registry with said mold; and, means arranged to operate automatically between successive downward strokes of said plunger-die to vary the pressure of said die with respect to said mold, substantially as set forth.

5. In a glass-press, the combination with a mold; of a plunger-die and means to reciprocate said die in registry with said mold; and, means arranged to operate automatically between successive downward strokes of said plunger-die to progessively increase the pressure of said die with respect to said mold, substantially as set forth.

6. In a glass-press, the combination with a mold; of a plunger-die and means to reciprocate said die, including an elastic medium; and means arranged to automatically vary the pressure of said elastic medium between successive downward strokes of the plunger-die, substantially as set forth.

7. In a glass-press, the combination with a mold; of a plunger-die; means to reciprocate said die, including an elastic medium and two coöperative cam members arranged to act on said elastic medium to increase or decrease the pressure thereof; and, means arranged to automatically actuate said cam members, substantially as set forth.

8. In a glass-press, the combination with a mold; of a plunger comprising an outer sleeve; a die-carrying member slidably mounted in one end of said sleeve; a rotatable cam member mounted in the other end of said sleeve; a coöperating cam member slidably mounted in said sleeve and provided with means to prevent its rotation relatively to said sleeve; a spiral spring interposed between said die-carrying member and the last-mentioned cam member; and means arranged to be automatically actuated by the reciprocation of the plunger, to rotate said first-mentioned cam member; whereby said spring is progressively compressed between successive downward strokes of the plunger, substantially as set forth.

9. In a glass-press, the combination with a carrier and means to intermittently rotate it; of a plurality of molds mounted in said carrier; a plunger-die arranged to coöperate with each mold in said carrier in succession; means to reciprocate said plunger-die, including an elastic medium; and means arranged to automatically operate between successive downward strokes of the plunger-die, to increase the pressure upon said elastic medium, whereby more pressure is exerted upon the glass in the molds at each successive stroke of the plunger-die, substantially as set forth.

10. In a glass-press, the combination with a bed-plate; of a carrier for a plurality of molds supported and guided thereon; a plunger; a die slidably mounted in said plunger, arranged to coöperate successively with the molds in the carrier; means to reciprocate said plunger; a cam member rotatably mounted in said plunger; a coöperating cam member slidably mounted in said plunger; an elastic medium interposed between said slidable cam member and said die; and, means to automatically turn said rotatable cam member step by step as the plunger reciprocates, whereby the capacity of said elastic medium to yield will be progressively decreased between successive strokes of the plunger, substantially as set forth.

11. In a glass-press, the combination with a carrier for a plurality of molds; of a plunger-die composed of an outer and an inner member; actuating mechanism for said plunger, having rigid connections to said outer member and having connections to said inner member involving an elastic medium; and, means arranged to automatically vary the pressure on said elastic medium between successive downward strokes of the plunger-die, substantially as set forth.

12. In a glass-press, the combination with a carrier supporting a plurality of molds; of a compound plunger-die comprising an outer annular member and a central member slidably mounted in said annular member; a driving-shaft; independent actuating connections between said shaft and each of said die members; the connections between the driving-shaft and said inner die member including an elastic medium; and, means actuated by the reciprocation of the plunger-die, arranged to progressively vary the pressure of said elastic medium between successive downward strokes of said plunger-die, substantially as set forth.

13. In a glass-press, the combination with a carrier having a plurality of molds; of a compound plunger-die composed of an outer annular member and a central member slidably mounted therein; a driving-shaft; independent actuating connections from said shaft to said die members; the connections to the inner die member comprising a compression-spring and two cam members, one being rotatable with respect to the other; a ratchet-wheel connected to the rotatable cam member; a lever pivoted to the outer plunger member; a pawl carried on one end of said lever and arranged to engage said ratchet; and a stationary projection arranged to engage the other end of said lever as the plunger-die rises; whereby the spring is compressed an additional amount at each stroke of the plunger-die, substantially as set forth.

14. In a glass-press, the combination with a carrier for a plurality of molds; of a plunger comprising an outer die-carrying member and an inner die-carrying member; positive means to reciprocate said outer member; yielding means to reciprocate said inner member; means to bring the molds successively into registry beneath the plunger-die; means to progressively decrease the capacity to yield of the inner plunger member as each successive mold is brought under the die and to increase said capacity to its maximum after a certain number of downward strokes of the plunger-die, substantially as set forth.

15. In a glass-press, a supporting-plate comprising an aperture; a rotatable mold-carrier comprising a circular series of apertures adapted to successively register with the aperture in said supporting-plate; a series of molds respectively mounted in said apertures in said carrier; pivotal supports for said molds eccentric to said apertures; and, means to intermittently shift said carrier whereby, as each mold is brought into registry with the aperture in the supporting-plate it is caused by gravity to swing downwardly on its eccentric pivot to discharge its molded article, substantially as set forth.

16. In a glass-press, the combination with a mold; of a plunger-die having relatively reciprocatory inner and outer members; means to reciprocate said die in registry with said mold; means to shift said mold away from said plunger; and, an overpress-platen carried by said plunger arranged to register with said shifted mold, substantially as set forth.

17. In a glass-press, the combination with a mold; of a plunger-die; means to reciprocate said die in registry with said mold; means to shift said mold away from said plunger; and, an overpress-platen carried by said plunger, in slidable relation therewith, arranged to register with said shifted mold, substantially as set forth.

18. In a glass-press, the combination with a mold; of a plunger-die; means to reciprocate said die in registry with said mold; means to shift said mold away from said plunger; an overpress-platen carried by said plunger, in slidable relation therewith, arranged to register with said shifted mold; and, means to yieldingly present said platen in definite relation to said mold, substantially as set forth.

19. In a glass-press, the combination with a mold; of a plunger-die; means to reciprocate said die in registry with said mold; means to shift said mold away from said plunger; an overpress-platen carried by said plunger in slidable relation therewith, arranged to register with said shifted mold; a shank for said platen; and, a spring mounted upon said shank arranged to yieldingly present said platen in definite relation to said mold, substantially as set forth.

In testimony whereof we have hereunto signed our names, at Philadelphia, in the State of Pennsylvania, this 3d day of April, 1903.

EPHRAIM ROGERS.
CHARLES W. SAGEE.

Witnesses:
JOSEPH RILING,
H. H. SINNAMAN.